(12) United States Patent
Toshima et al.

(10) Patent No.: US 8,682,481 B2
(45) Date of Patent: Mar. 25, 2014

(54) MEDIA PROCESSING DEVICE, CONTROL METHOD FOR A MEDIA PROCESSING DEVICE, AND A CONTROL PROGRAM THEREFOR

(75) Inventors: Kazuya Toshima, Ueda (JP); Yoshimitsu Sezai, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 670 days.

(21) Appl. No.: 12/565,647

(22) Filed: Sep. 23, 2009

(65) Prior Publication Data

US 2010/0072689 A1    Mar. 25, 2010

(30) Foreign Application Priority Data

Sep. 24, 2008  (JP) .................. 2008-243502

(51) Int. Cl.
 *B65H 5/00*    (2006.01)
(52) U.S. Cl.
 USPC ............................ 700/227; 700/303; 271/152
(58) Field of Classification Search
 USPC .................................................... 700/227
 See application file for complete search history.

(56) References Cited

U.S. PATENT DOCUMENTS

| 4,815,725 A * | 3/1989 | Kanaya .................... 271/258.01 |
| 2005/0157605 A1* | 7/2005 | Lilland et al. ............. 369/30.36 |
| 2007/0052155 A1* | 3/2007 | Cook et al. ................. 271/152 |
| 2008/0105142 A1* | 5/2008 | Ichikawa et al. ............. 101/35 |
| 2008/0109117 A1* | 5/2008 | Ichikawa et al. ............ 700/303 |

FOREIGN PATENT DOCUMENTS

| JP | 2005-007650 A | 1/2005 |
| JP | 2005-259318 A | 9/2005 |
| JP | 2008-090966 A | 4/2008 |

\* cited by examiner

*Primary Examiner* — Gene Crawford
*Assistant Examiner* — Kyle Logan
(74) *Attorney, Agent, or Firm* — Kilpatrick Townsend & Stockton LLP

(57) ABSTRACT

A media processing device, a control method for a media processing device, and a control program for the same can accurately detect the last one or specified number of media stored in the media stacker. Media stackers store media in a stack. Media processing units write data and/or print a label on the media. A media transportation mechanism has a transportation arm that can hold the media and move vertically, and transports the media between the media stackers and the media processing units by movement of the transportation arm. A control unit controls the media processing units and the media transportation mechanism 31. The control unit has a measurement unit that measures the height of media stacked in the media stacker when media is removed from the stacker by the media transportation mechanism, and a comparison unit that compares the measured media height with a reference value to detect the difference therebetween, and determines the remaining media count in the media stacker.

19 Claims, 10 Drawing Sheets

MEDIA PROCESSING DEVICE, CONTROL METHOD FOR A MEDIA PROCESSING DEVICE, AND A CONTROL PROGRAM THEREFOR

This application claims priority to Japanese Patent Application No. 2008-243502, filed Sep. 24, 2008, the entirety of which is incorporated by reference herein.

BACKGROUND OF THE INVENTION

1. Field of Invention

The present invention relates to a media processing device having a media transportation mechanism that conveys media such as CDs and DVDs, and to a control method and a control program for a media processing device.

2. Description of Related Art

Media processing devices that write data and print labels on large numbers of media (information recording media) such as CD (Compact Disc) and DVD (digital versatile disc) media are known in the art. Such media processing devices typically have a media stacker (media storage unit) for storing disc-shaped media in a stack, media processing units such as a media drive for writing data to the media and a label printer for printing on the label side of the media, and a media transportation mechanism for holding and conveying the media to and from the media processing units (the media drive and label printer).

The media processing device sequentially picks the media stacked in the media stacker by means of the transportation arm of the media transportation mechanism for writing data or printing a label. As a result, the number of media stored in the media stacker gradually decreases. When no media is left in the media stacker, unprocessed blank media must be loaded into the media stacker. To eliminate wasting work time and to enable efficient media processing, the user is preferably prompted to refill the media stacker before the supply of media in the media stacker is completely depleted, such as before the last disc is processed.

To solve this problem, various methods of measuring the height of the remaining media in the media processing device have been proposed. See, for example, Japanese Unexamined Patent Appl. Pub. JP-A-2008-90966 (pages 5-10, FIG. 7). This media processing device calculates the difference between the height of the bottom when the media stacker is empty, which is stored in a storage unit (EEPROM, for example), and the height of the media stacked in the media stacker, which is measured. How many media are left in the media stacker is then determined from this calculated difference and the thickness of the media to detect when the remaining media count goes to 1.

In a media processing device according to the prior art the height of the bottom of the media stacker when empty (also referred to below as the "bottom height of the empty media stacker") is predetermined by the design dimensions of the device and is stored in a storage unit (such as EEPROM) when shipped from the factory. However, the actual bottom height of the empty media stacker will vary between typically manufactured media processing devices because of deviation in the assembly precision and the molding precision of the component parts, as well as aging over time. The media thickness may also vary due to the type of media and surface processing.

Therefore, if the difference between the bottom height of the empty media stacker of the actual manufactured device and the value that is stored in the storage unit increases, it will not be possible to accurately detect when the remaining media count becomes 1. To solve this problem the bottom height of the empty media stacker in the manufactured products can conceivably be made more uniform between individual products by increasing the molding precision of the component parts as well as assembly precision, but this increases the production cost.

In addition, even if the bottom height of the empty media stacker is uniform at the time of manufacture, deviation from the value immediately following manufacture will occur over time due to aging.

As a result, there may actually be two (or more) media left when the remaining media count is determined to be 1. Therefore, the media processing device according to the prior art requires a step of physically checking that media is not present by attempting to pick media again after picking the media identified as the one remaining media.

SUMMARY OF THE INVENTION

A media processing device, a control method for a media processing device, and a control program for the same are directed to solving the foregoing problem by being able to accurately detect the last single medium stored in the media stacker without increasing the production cost and while accommodating changes over time.

A media processing device according to an aspect of the invention has a media stacker that stores media in a stack, a media processing unit that writes data and/or prints a label on the media, a media transportation mechanism having a transportation arm that can hold and move the media, and transport the media between the media stacker and the media processing unit, a storage unit that stores a media height when a specified number of media is in the media stacker as a reference value, and a control unit that controls the media processing units and the media transportation mechanism, the control unit includes a measurement unit that measures the height of media stacked in the media stacker when media is removed from the stacker by the media transportation mechanism, and a comparison unit that compares the measured media height with the reference value to detect the difference therebetween, and determines the remaining media count in the media stacker when the difference is within a specified range.

This aspect of the invention saves the height of the media when the remaining media count reaches a predetermined number as a reference value set separately for the media processing device and each media stacker therein. As a result, an accurate reference value can be acquired for each product even if there are dimensional differences in each product due to variation in the molding precision of device parts and deviations in assembly. In addition, by using an accurate reference value, the last medium can be detected with great accuracy. As a result, it is not necessary to repeat the media picking operation for confirmation after picking the last medium, and wasteful operations can be eliminated.

Preferably, the storage unit stores a media thickness, and the comparison unit determines the remaining media count in the media stacker based on the specified range defined according to the media thickness.

This aspect of the invention determines the difference between the measured media height and the reference value, and if this difference is within the media thickness tolerance range of the media being used, can determine that the remaining media count is one. More specifically, deviations in the media processing device are allowable within the tolerance range of the media thickness.

Further preferably, the control unit includes an update unit that updates the reference value using as a new reference value, the media height at which the comparison unit determines the media is of a specified number when a medium is removed by the media transportation mechanism.

With this aspect of the invention the reference value is updated using the measured value as the new reference value each time the measured value of the stacked media height is determined to equal a specified remaining media count. As a result, because a recently measured value is set as the reference value, the media height can be accurately measured even when the bottom position (height) of the media stacker changes due to aging of the media processing device.

Furthermore, even if the user uses media conforming to different standards, including the media thickness, this aspect of the invention can accurately measure the media height because the reference value is updated accordingly based on the medium that is actually used. In addition, the specific number that is used for this determination can be changed.

Yet further preferably, the update unit updates the reference value only when the measured value differs from the previous reference value by a specific value or more.

This aspect of the invention can update the reference value only when necessary, and not update the reference value when there is substantially no difference between the measured value and the reference value.

Yet further preferably, the control unit includes a notification unit that reports to a host computer that the media stacker is in a no-media state (a near-end state denoting that few media remain and there will soon be none) when the comparison unit determines the media is a specified number when a medium is removed by the media transportation mechanism.

This aspect of the invention displays on a display unit of the host computer, for example, that there are no media, and prompts the user to replenish the media supply before the last medium is processed.

Another aspect of the invention is a control method for a media processing device that has a media storing media in a media stacker, comprising receiving a request to process the media, transporting the media using a media transportation mechanism having a transportation arm between the media stacker and a media processing unit by moving the transportation arm, measuring the media height in the media stacker; and comparing the media height with a reference value to detect the difference therebetween, and determining the remaining media count in the media stacker.

This aspect of the invention saves the height of the media when the media reaches a predetermined number as a reference value set separately for the media processing device and each media stacker therein. As a result, an accurate reference value can be acquired for each product even if there are dimensional differences in each product due to variation in the molding precision of device parts and deviations in assembly. In addition, by using an accurate reference value, the last medium can be detected with great accuracy. As a result, it is not necessary to repeat the media picking operation for confirmation after picking the last medium, and wasteful operations can be eliminated.

Preferably, the control method for a media processing device also has a step of updating the reference value using as a new reference value the media height at which the control unit determines the media is a specified number.

With this aspect of the invention the reference value is updated using the measured value as the new reference value each time the measured value of the stacked media height is determined to equal a specified media count. As a result, because a recently measured value is set as the reference value, the media height can be accurately measured even when the bottom position (height) of the media stacker changes due to aging of the media processing device.

Another aspect of the invention is a control program for a media processing device according to the invention that causes the control unit of the media processing device to execute the steps of the control method for a media processing device described above.

By causing the control unit of the media processing device described above to execute this program, an accurate reference value can be acquired for each individual product even if there are dimensional differences in each product caused by deviations in the precision of component moldings and differences in assembly.

In addition, the last medium can be detected with great accuracy by using an accurate reference value. As a result, it is not necessary to repeat the media picking operation for confirmation after picking the last medium, and wasteful operations can be eliminated.

Furthermore, because a recently measured value is set as the reference value, the media height can be accurately measured even when the bottom position (height) of the media stacker changes due to aging of the media processing device.

Furthermore, even if the user uses media conforming to different standards, including the media thickness, this aspect of the invention can accurately measure the media height because the reference value is updated accordingly based on the medium that is actually used.

Other objects and attainments together with a fuller understanding of the invention will become apparent and appreciated by referring to the following description and claims taken in conjunction with the accompanying drawings.

DESCRIPTION OF PREFERRED EMBODIMENTS

Preferred embodiments of a media processing device, a control method for a media processing device, and a control program for the same according to the present invention are described below with reference to the accompanying figures.

Figure 1:
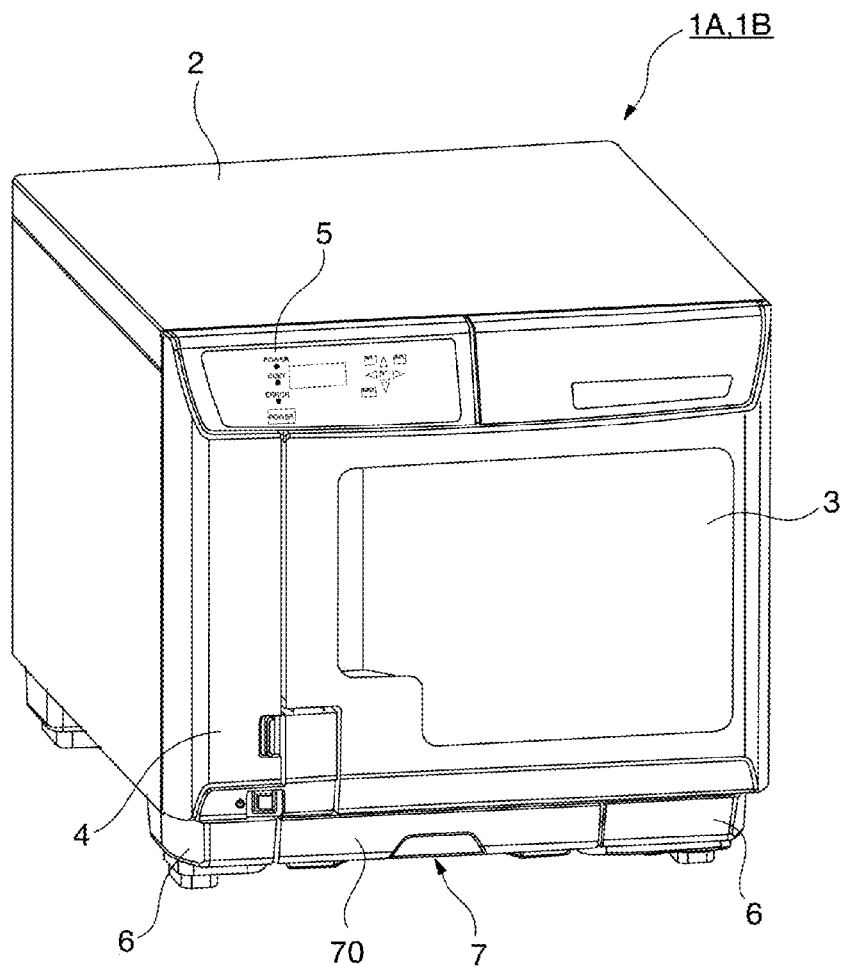
FIG. 1 is an external oblique view of a media processing device with the access covers closed according to an embodiment of the invention.
Figure 2:
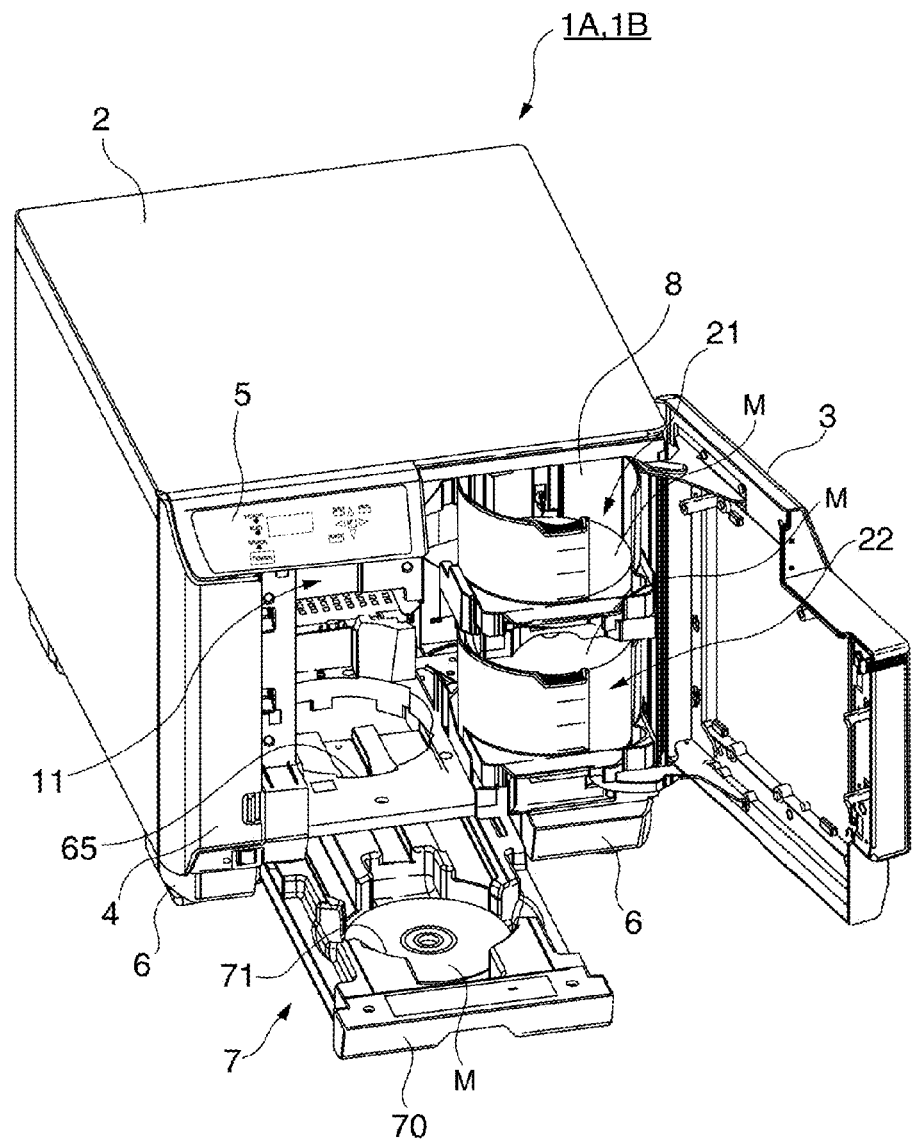
FIG. 2 is an external oblique view of the media processing device with the access doors open.
Figure 3:
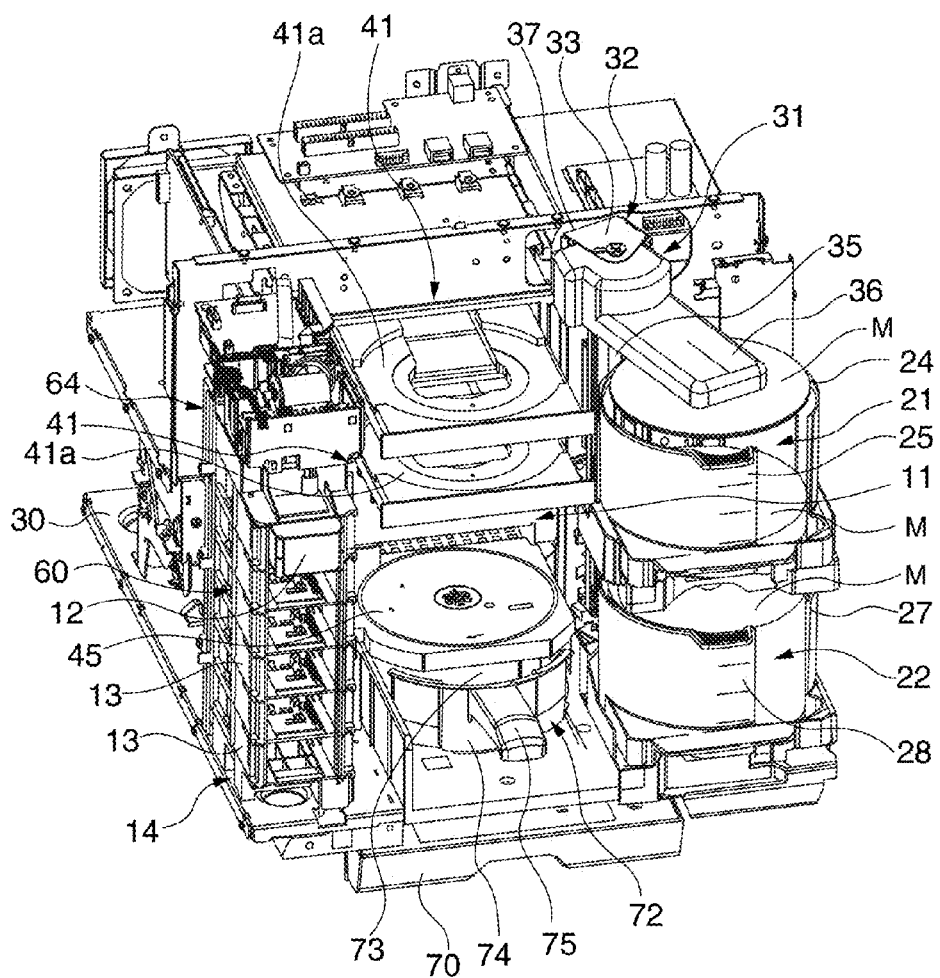
FIG. 3 is an oblique view from the top front side of the media processing device with the case removed.

FIG. 1 is an external oblique view of a media processing device when the parts thereof are closed, FIG. 2 is an external oblique view of the media processing device when the parts are open, and FIG. 3 is an oblique view from above the front of the media processing device with the case thereof removed.

As shown in FIG. 1, the media processing device 1A, 1B is a device that writes data and prints on the label side of disc-shaped media such as CDs and DVDs, and has a basically box-shaped case 2. Doors 3 and 4 that open and close to the right and left are attached at the front of the case 2. An operating panel 5 having various indicators and operating buttons is disposed at the top left part of the case 2, and support legs 6 project down from the bottom of the case 2 on both right and left sides. A drawer mechanism 7 is disposed between the right and left legs 6.

As shown in FIG. 2, the access door 3 on the right side when seen from the front opens and closes for access to an open area 8 at the front of the media processing device 1A, 1B. The access door 3 opens and closes for loading unused media M (blank media to which printing or data writing processes have not been applied) through the open area 8 and for removing finished media M from the open area 8.

The access door 4 on the front left side opens and closes for replacing the ink cartridges 12 of the label printer 11 shown in FIG. 3. When the door 4 is open, a cartridge carrier unit 14 with a plurality of cartridge holders 13 arrayed in a vertical stack is exposed.

As shown in FIG. 2 and FIG. 3, a media stacker 21 used as a media storage unit for holding a plurality of unused discs M (such as 50) to which data has not been written, and a media stacker 22 used as a media storage unit for holding a plurality (such as 50) of completed discs M or blank discs M, are disposed one above the other inside the case 2 of the media processing device 1A, 1B so that the center axes of the media M stored therein are the same. The blank media stacker 21 and the completed media stacker 22 can be freely installed to and removed from their respective positions.

The top media stacker 21 has a pair of right and left curved side walls 24 and 25. The blank discs M are thus received from the top and can be stored in a substantially coaxial stack. The task of storing or loading blank discs M into the blank media stacker 21 can be done easily by opening the door 3 and pulling the media stacker 21 out.

The bottom media stacker 22 is identically constructed with a pair of right and left curved side walls 27 and 28. As a result, the discs M can be received from the top and can be stored in a substantially coaxial stack.

As shown in FIG. 3, a media transportation mechanism 31 is located behind the media stackers 21 and 22. The media transportation mechanism 31 has a vertical guide shaft 35 disposed vertically between the main frame 30 and the top plate 33 of the chassis 32. A transportation arm 36 is supported so that it can move up and down and rotate on the vertical guide shaft 35. The transportation arm 36 can move vertically up and down along the vertical guide shaft 35 and can pivot right and left on the vertical guide shaft 35 by means of a drive motor 37.

Two media drives 41 are disposed one above the other at a position behind and beside the two stackers 21 and 22 and the media transportation mechanism 31. The carriage (not shown in the figure) of the label printer 11 is disposed movably below the media drives 41.

Each of the media drives 41 has a media tray 41a, which can move between a data writing position where data is recorded to the discs, and a media transfer position where the media can be loaded and unloaded from the media tray 41a.

The label printer 111 also has a media tray 45 that can move between a printing position for printing a label on the label side of the media M, and a media transfer position where the media can be loaded and unloaded from the media tray 45.

FIG. 3 shows the media trays 41a of the top and bottom media drives 41 pulled out to the media transfer position, and the media tray 45 of the label printer 11 therebelow pulled out to the media transfer position.

The label printer 11 in this example is an inkjet printer that uses color ink cartridges 12 (for six colors, specifically, black, cyan, magenta, yellow, light cyan, and light magenta) as the ink supply mechanism 60. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the one media stacker 21 and between the pair of right and left side walls 27 and 28 of the other media stacker 22. A space is also formed between the top and bottom media stackers 21 and 22 so that the transportation arm 36 of the media transportation mechanism 31 can pivot horizontally for positioning directly above the bottom media stacker 22. When both media trays 41a are pushed into the media drives 41, the transportation arm 36 of the media transportation mechanism 31 descends and can access the media tray 45 of the label printer 11 at the media transfer position.

When both media trays 41a are in the data writing position and the media tray 45 for the label printer 11 is at the inside printing position, the transportation arm 36 of the media transportation mechanism 31 can descend below the height of the media tray 45. A guide hole through which a disc M released by the transportation arm 36 after descending to this position passes is located below the media transfer position of the printer media tray 45, and another media stacker can be installed in this guide hole 65.

As shown in FIG. 2 and FIG. 3, the drawer mechanism 7 has a drawer-like tray 70 disposed below the main frame 30 so that the drawer tray 70 can be pulled out from the main frame 30 and opened or slid into the main frame 30 and closed. The drawer tray 70 has a recess in which a media stacker unit 71 can store the media M. When this drawer tray 70 is in the stored (closed) position, the media stacker unit 71 is positioned below the guide hole 65. The center of the media stacker unit 71 is positioned with the center of the media stacker unit 71 coaxial to the center axis of both media trays 41a and the printer media tray 45 in the media transfer position. This media stacker unit 71 accepts media M guided thereinto by the guide hole 65, and stores a relatively small number of media M (such as 5 to 10). The media stacker unit 71 accepts the media M from the top and stores the media M stacked coaxially.

A different media stacker 72 (removable media stacker) that can hold more media M than the media stacker unit 71 can be removably installed in the guide hole 65 and the media stacker unit 71 of the drawer tray 70 in the storage position (see FIG. 3). This media stacker 72 also has two curved side walls 73 and 74, and the media stacker 72 can thereby receive media M from the top and can store a plurality of media M (such as 50) in a coaxial stack. A gap enabling the transportation arm 36 of the media transportation mechanism 31 to move up and down is also formed between the pair of curved side walls 73 and 74. A handle 75 that is held by the user when installing and removing the media stacker 72 is disposed at the top part of the one side wall 74.

When the media stacker 72 is installed, a blank disc M can be taken from the bottom media stacker 22, written and printed by a media drive 41 and the label printer 11, and then deposited in the media stacker 72.

For example, both the top media stacker 21 and the bottom media stacker 22 may each be loaded to the maximum capacity (50 discs+50 discs in this embodiment of the invention) with blank media M. All media M (50) in the bottom media stacker 22 are then sequentially processed and stored in the media stacker 72, and then all media M (50) in the top media stacker 21 are sequentially processed and stored in the emptied bottom media stacker 22. This enables processing the maximum number of media M (50+50) that can be loaded in the top media stacker 21 and the bottom media stacker 22 in a single operation (the "batch processing mode").

When the media stacker 72 has been removed, a blank disc M can be removed from the top media stacker 21 or the bottom media stacker 22, the disc can be written and printed by the media drive 41 and label printer 11, and the completed disc can then be stored in the media stacker unit 71 of the drawer tray 70 in the stored (closed) position.

The completed media M can thus be removed from the media stacker unit 71 by pulling the drawer tray 70 out. More specifically, completed media M can be sequentially removed one by one or plural discs at a time while processing other media M continues with the access door 3 remaining closed. This is also referred to herein as the "external discharge mode."

The media M can thus be appropriately conveyed between the top media stacker 21, the bottom media stacker 22, the media stacker unit 71 (or media stacker 72) of the drawer tray 70, the media trays 41a of the media drives 41, and the printer media tray 45 of the label printer 11 by the transportation arm 36 of the media transportation mechanism 31 moving up and down and pivoting right and left in various combinations.

Media Transportation Mechanism

Figure 4:
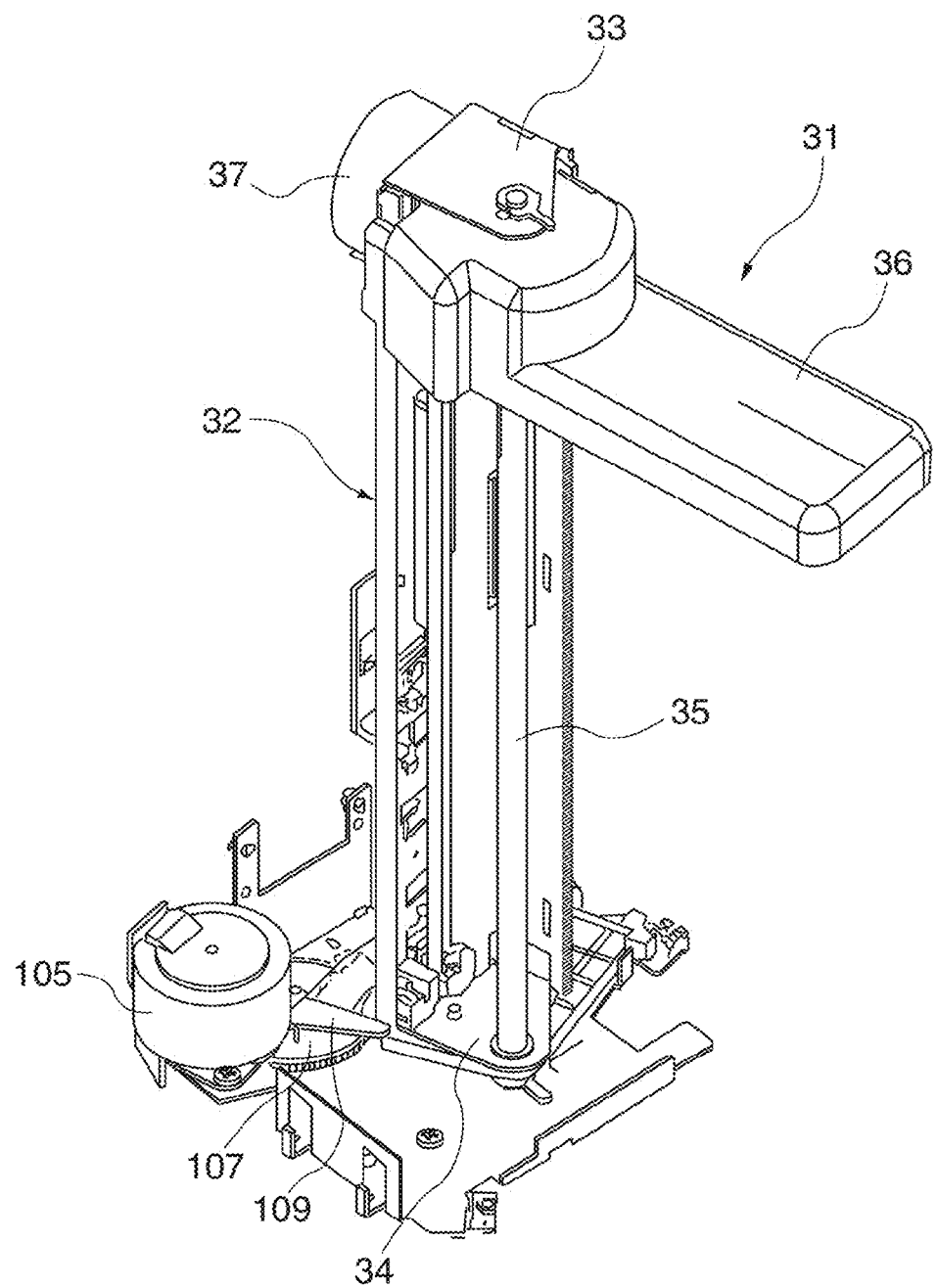
FIG. 4 is an oblique view of the media transportation mechanism.

FIG. 4 is an oblique view of the media transportation mechanism. As shown in FIG. 4, the media transportation mechanism 31 has a chassis 32 that is disposed vertically, and a vertical guide shaft 35 disposed vertically between the support plate 34 fastened to the main frame 30 and the top plate 33 of the chassis 32. The transportation arm 36 is supported so that it can move vertically and pivot horizontally on the vertical guide shaft 35.

The elevator mechanism of the transportation arm 36 has a drive motor 37 that is the drive power source for raising and lowering the transportation arm 36. Drive motor 37 rotation is transferred to a drive pulley that drives a timing belt (not shown in the figure) disposed vertically to the chassis 32. The base part 110 of the transportation arm 36 is connected to part of this timing belt.

As a result, when the drive motor 37 is driven, the timing belt moves vertically and the transportation arm 36 attached to the timing belt travels up or down along the vertical guide shaft 35. Note that in this embodiment of the invention the drive motor 37 is a stepping motor and the vertical position of the transportation arm 36 can be controlled according to the number of steps the drive motor 37 is driven.

As shown in FIG. 4, the pivot mechanism of the transportation arm 36 has a drive motor 105 as the drive power source for swinging the transportation arm 36 horizontally. A pinion (not shown in the figure) is attached to the output shaft of the drive motor 105. Rotation of the pinion is transferred through a speed-reducing gear train including a transfer gear 107 to a fan-shaped end gear 109. This fan-shaped end gear 109 can rotate right and left centered on the vertical guide shaft 35. The chassis 32 on which the component parts of the elevator mechanism of the transportation arm 36 are assembled is mounted on the end gear 109. When the drive motor 105 is driven, the fan-shaped end gear 109 pivots rotationally left and right, and the chassis 32 mounted thereon pivots in unison left and right on the vertical guide shaft 35. As a result, the transportation arm 36 supported by the elevator mechanism mounted on the chassis 32 swings left and right on the vertical guide shaft 35.

Figure 5:
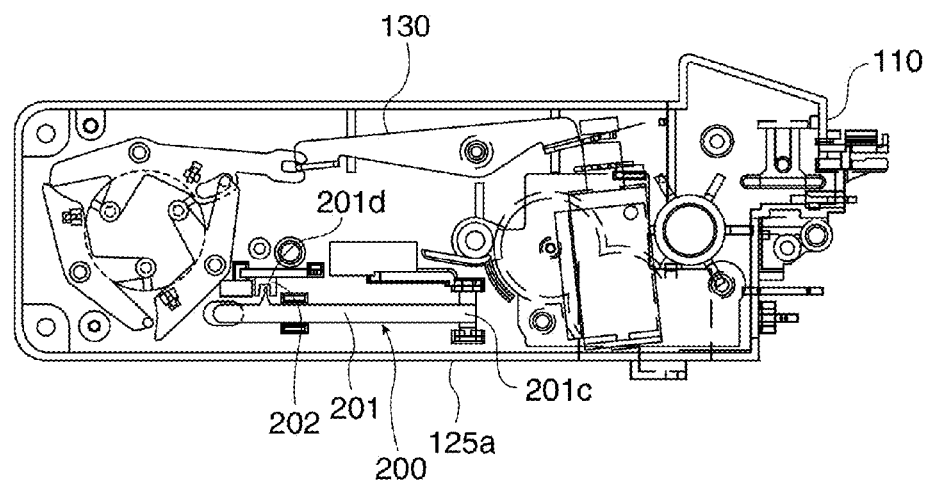
FIG. 5 is a plan view of the arm base with a media detection mechanism.
Figure 6:
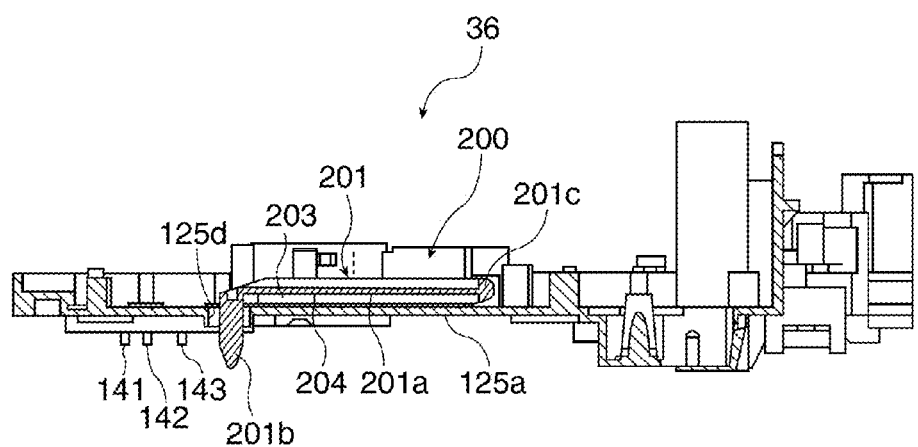
FIG. 6 is section view showing the structure of the media detection mechanism.
Figure 7:
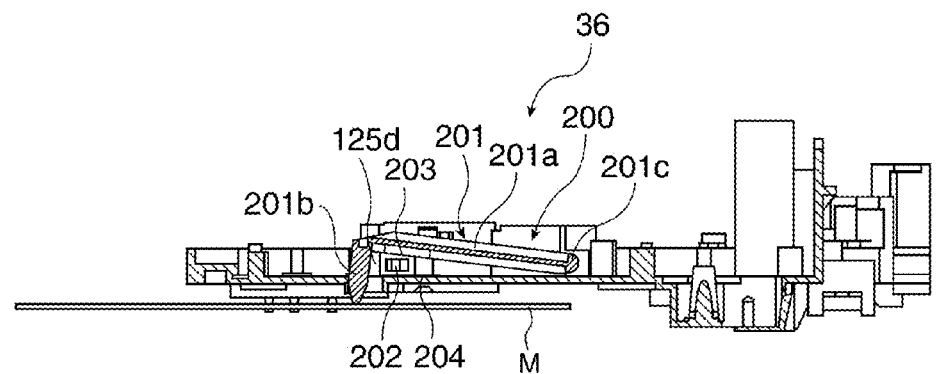
FIG. 7 is section view describing the operation of the media detection mechanism.

The media detection mechanism disposed to the transportation arm 36 is described next. FIG. 5 is a plan view of the arm base with the media detection mechanism. FIG. 6 is a section view showing the structure of the media detection mechanism, and FIG. 7 is a section view describing the operation of the media detection mechanism.

As shown in FIG. 5, the transportation arm 36 has a long, slender arm base 125a that is substantially rectangular in plan view, and an arm case that has the same outside contour as and covers the top of the arm base 125a. Disposed to the transportation arm 36 are a gripping mechanism 130 for holding the media M, and a media detection mechanism 200. Note that the gripping mechanism is a mechanism known in the art for appropriately holding a single disc-shaped medium, and detailed description thereof is thus omitted.

As shown in FIG. 5 and FIG. 6, the media detection mechanism (media detection unit) 200 has a detection lever 201. The detection lever 201 has an arm 201a of which the base end is supported centered on a horizontal axis so that the distal end can rock vertically, and a contact unit 201b rendered as a detection probe by bending the distal end of the arm 201a down so that it protrudes from the bottom of the arm base 125a. The media detection mechanism 200 also has a detector 202 (media detector) disposed beside the detection lever 201.

In the media-not-detected position shown in FIG. 6, the arm 201a of the detection lever 201 rests on the arm base 125a. The contact unit 201b passes through an opening 125d formed in the arm base 125a, and protrudes a specific length below the arm base 125a, that is, to the side on which the media is held.

The detector 202 is a transmitting optical sensor. When in the media-not-detected position shown in FIG. 6, a detection finger 201d (see FIG. 5) that protrudes to the side near the distal end of the arm 201a interrupts the detection beam in the detection area of the detector 202, and the detection signal of the detector 202 is thus off.

When the transportation arm 36 descends and the contact unit 201b on the distal end of the detection lever 201 contacts the top of the media M, the detection lever 201 of this media detection mechanism 200 pivots up. When the detection finger 201d of the detection lever 201 is displaced from the media-not-detected position touching the arm base 125a (the position shown in FIG. 6) to the media-detected position separated from the arm base 125a (shown in FIG. 7), and moves out of the detection area of the detector 202, the detector 202 turns on. Proximity to the media M, that is, media M that is held by the gripping mechanism 130, can be detected from the detection signal of the detector 202.

The media detection mechanism 200 also has a magnet (attraction unit) 203 disposed to the arm 201a of the detection lever 201. This magnet 203 is a plastic magnet having a magnetic body mixed with a synthetic resin, and is affixed to the arm 201a of the detection lever 201. A steel plate (attraction unit) 204 that is attracted by the magnet 203 is disposed to the top of the arm base 125a at a position opposite the magnet 203 disposed to the arm 201a of the detection lever 201.

When the detection lever 201 of this media detection mechanism 200 contacts the arm base 125a and the contact unit 201b of the detection lever 201 is protruding below the bottom of the arm base 125a in the media-not-detected position, the magnetic force of the magnet 203 pulls the magnet 203 and the steel plate 204 together. As a result, when the detection lever 201 is in the media-not-detected position with the contact unit 201b protruding below the bottom of the arm base 125a, the force of attraction between the mutually attracted magnet 203 and steel plate 204 prevents the detection lever 201 from rocking.

When the transportation arm 36 then descends from this position to where the top of the media M touches the contact unit 201b on the end of the detection lever 201, a pushing up force is applied to the distal end of the detection lever 201 as shown in FIG. 7. When this lifting force causes the mutually attracted magnet 203 and steel plate 204 to separate, the detection lever 201 rocks upward pivoting where the base end of the arm 201a joins the arm base 125a. The detection lever 201 is thus displaced from the media-not-detected position in contact with the arm base 125a to the media-detected position separated from the arm base 125a.

Conversely, when the transportation arm 36 then rises and separates from the disc M, the detection lever 201 that was pivoted up to the media-detected position descends again due to its own weight. When the detection lever 201 swings down and is positioned to the media-not-detected position, the magnet 203 of the arm 201a contacts the steel plate 204, and the magnet 203 and steel plate 204 are mutually attracted due to the magnetic force of the magnet 203. As a result, the detection lever 201 is again held by the force of attraction between the magnet 203 and steel plate 204 so that the detection lever 201 does not move.

The control system of a media processing device for achieving the media processing device and control method therefor according to the first embodiment of the invention is described next.

Figure 8:
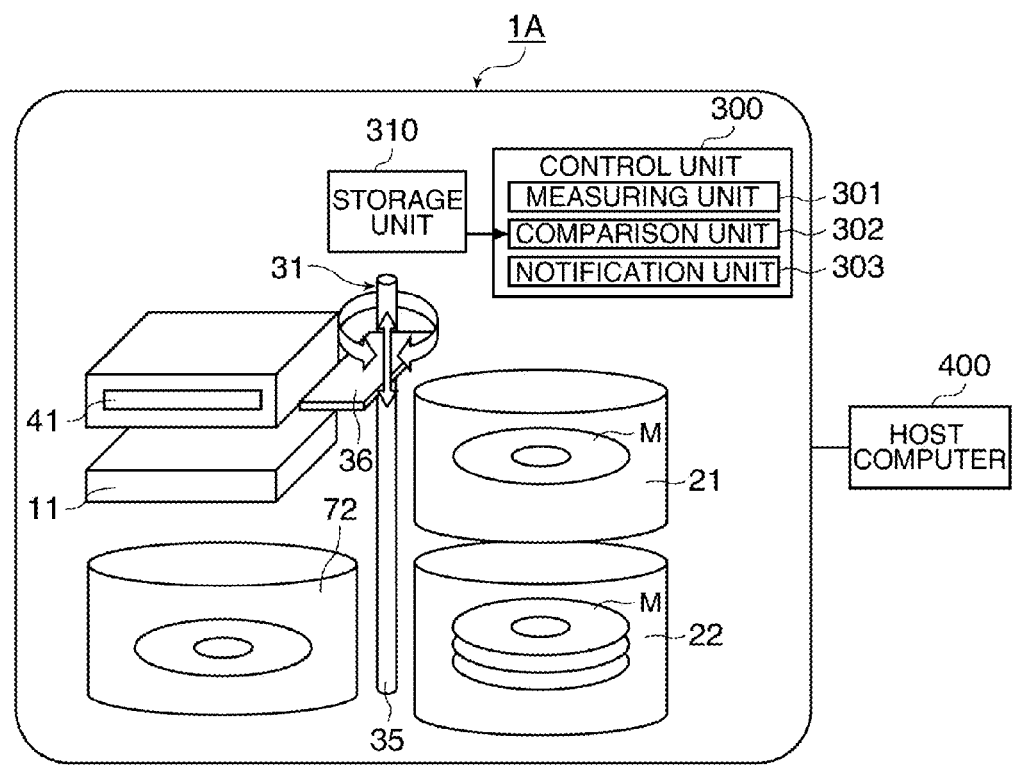
FIG. 8 is a block diagram showing the configuration of the main parts of the control system of the media processing device according to an embodiment of the invention.

FIG. 8 is a block diagram showing the main components of the control system of the media processing device according to the first embodiment of the invention. As shown in the figure, the media processing device 1A has a control unit 300 rendered by a CPU, for example, for controlling the other parts, and a storage unit 310. The control unit 300 controls the media drives 41 and label printer 11 disposed as media processing units for writing data and printing labels, and the media transportation mechanism 31 for conveying media to these media processing units (the media drives 41 and label printer 11). The control unit 300 is also connected to a host computer 400.

The control unit 300 has a measuring unit 301 that controls the media transportation mechanism 31 including the vertically movable transportation arm 36, and measures the height of the media in the media stackers 21 and 22 each time the media picking process executes. The control unit 300 also has a comparison unit 302 and a notification unit 303. The comparison unit 302 compares the measured media height with a reference value, and if this difference is within a predetermined range the comparison unit 302 determines that number of media remaining in the media stacker 21 or 22 is one or another predetermined count. The notification unit 303 reports to the host computer 400 when the remaining media count in the media stacker 21, 22 at the current time is one or the specified count.

The measuring unit 301 of the control unit 300 measures the media height as follows.

The amount of arm movement is calculated according to a transportation command specifying the destination of the transportation arm 36. More specifically, the measuring unit 301 calculates the number of rotations driven by the elevator drive motor 37 and the pivot drive motor 105 connected to the transportation arm 36, and moves the transportation arm 36 to the specified destination. When the transportation arm 36 is moved to the top media stacker 21 or bottom media stacker 22 according to the media processing command, the elevator drive motor 37 is driven to lower the transportation arm 36. The height of the media stacked for processing is then measured from the number of steps (the rotational distance) the drive motor 37 is driven until the transportation arm 36 contacts the media stacked for processing in the corresponding media stacker (more specifically, until the transportation arm 36 is raised slightly to the media-not-detected position after contacting the media as described below).

Figure 9:
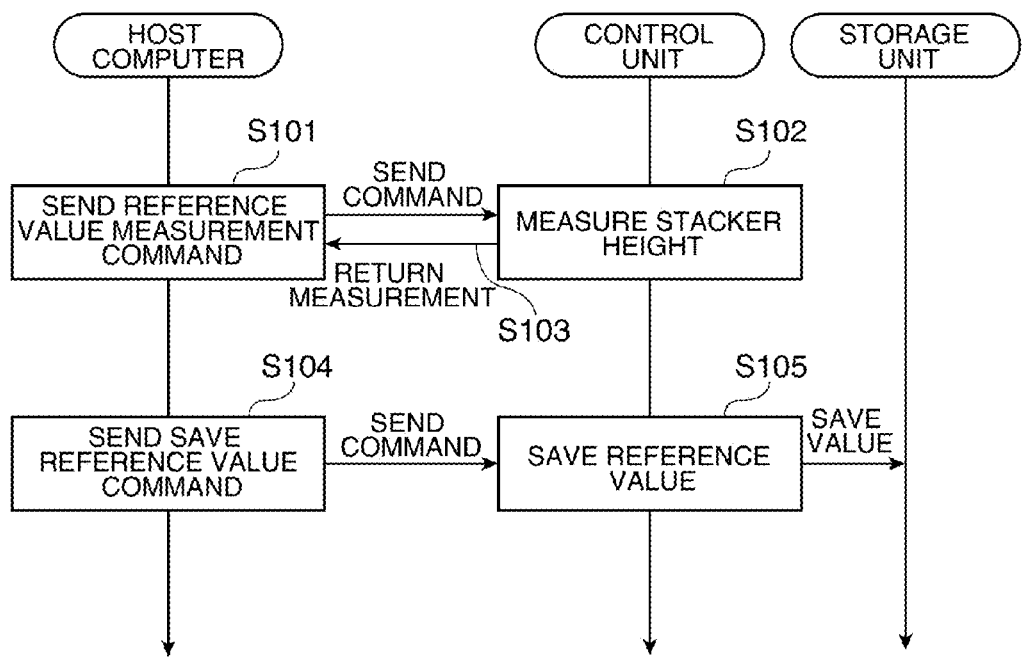
FIG. 9 is a flow chart showing the reference value setting process of the control method of a media processing device according to embodiments of the invention.
Figure 10:
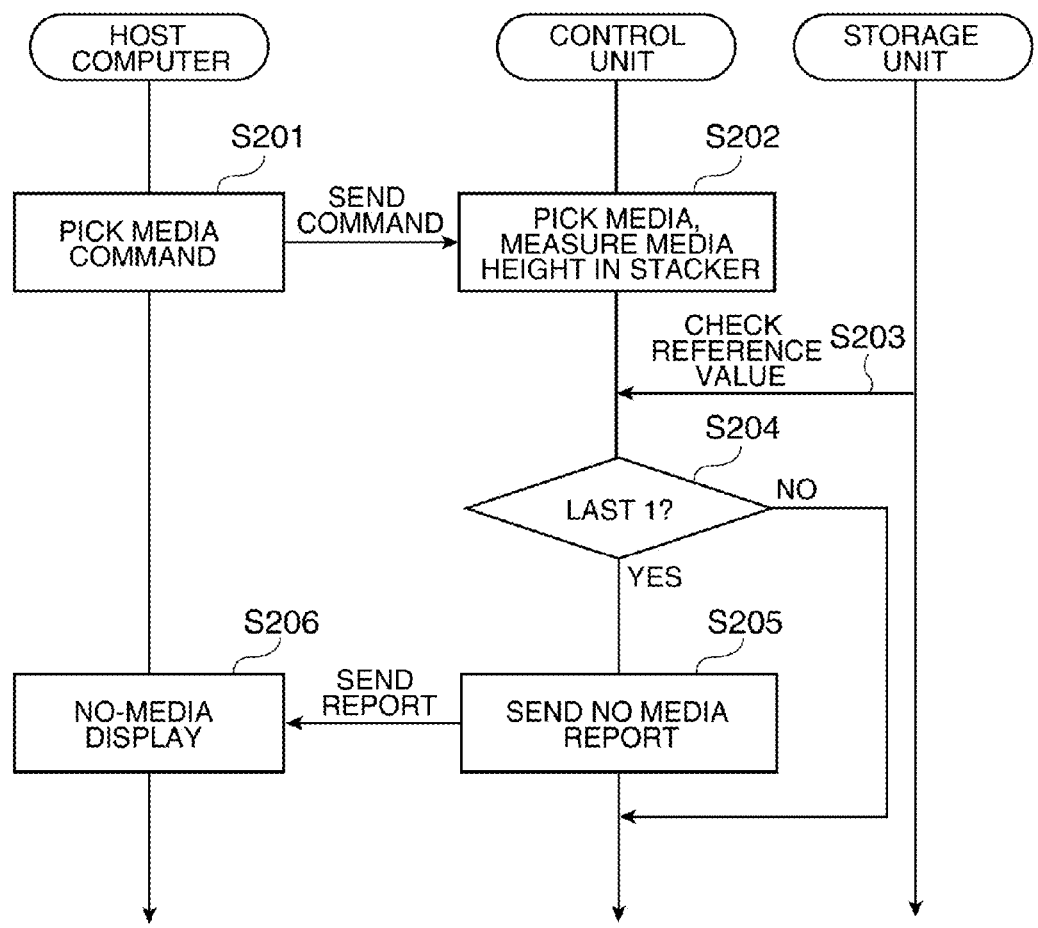
FIG. 10 is a flow chart describing the control method of a media processing device according to an embodiment of the invention.

The control method of a media processing device according to the first embodiment of the invention is described next. FIG. 9 and FIG. 10 are flow charts describing the control method of a media processing device according to the first embodiment of the invention.

During production of the media processing device 1A, the control method of a media processing device according to the first embodiment of the invention controls the media transportation mechanism 31 having a vertically movable transportation arm 36 by means of a control unit 300 to measure the media height in the media stackers 21 and 22 (note that media stacker 21 is used by way of example below) containing only one or a specified number of reference media that are manufactured to the precise thickness defined by the media standard. The measured media height is then set as the factory reference value and stored in the storage unit 310, which is rendered by a nonvolatile memory device (such as EEPROM). The storage unit 310 also stores the rated thickness and tolerance of different types of media.

Operation is described in detail below with reference to FIG. 9 and FIG. 10. Referring first to FIG. 9, it is assumed that one reference disc of which the thickness is precisely controlled to the specified thickness of the media standard is in the media stacker prior to shipping from the factory. At this time the host computer 400 asserts a command to measure the reference value (step S101).

When this measurement command is received, the measuring unit 301 controls the media transportation mechanism 31 and measures the media height (step S102). The notification unit 303 then reports the measured media height to the host computer 400 (step S103).

To measure the media height the measuring unit 301 first causes the transportation arm 36 to descend inside the media stacker 21. If the media detection mechanism 200 detects that media is present, the measuring unit 301 stops the transportation arm 36 and then raises the transportation arm 36 while looking for the position where the media detection mechanism 200 no longer detects the media. The media height is the height where the media detection mechanism 200 does not detect the media.

The host computer 400 then tells the control unit 300 to set the measured media height that was reported as the reference value (step S104).

The control unit 300 then saves this measured value in the storage unit 310 as the factory reference value denoting the media height when there is only one medium left in the media stacker (step S105).

When the media processing device 1A is then used, the comparison unit 302 measures the stacked media height each time the media picking operation executes. If the media height of the measured stack is within the tolerance range of the rated media thickness with regard to the reference value, the comparison unit 302 determines the remaining media count in the media stacker 21 is one.

The control process when the media processing device 1A is used is described next with reference to FIG. 10.

As shown in FIG. 10, when a media pick command is sent from the host computer 400 based on a media processing command, for example, when the media processing device is used (step S201), the control unit 300 measures the height of the media stack in the media stacker 21 containing media and executes the media picking process (step S202).

As described above, the method of measuring the stacked media height at this time also first causes the transportation arm 36 to descend inside the media stacker 21. When the media detection mechanism 200 detects that media is present, the transportation arm 36 is stopped and the transportation arm 36 is then raised, and the position where the media detection mechanism 200 no longer detects the media is used as the measured value of the stacked media height.

The comparison unit 302 then reads the reference value that was stored at the factory (step S203) and determines if the measured value is within the tolerance range of the rated media thickness with regard to the reference value, and determines if the detected media is the last one left in the media stacker (step S204).

The disc media that can be used in the media processing device 1A according to this embodiment of the invention include CD and DVD media. The rated media thickness and thickness tolerance (+/−) are 1.2 mm (+0.3 mm/−0.1 mm) (JIS-S8605) for CD media, and are 1.2 mm (+0.3 mm/−0.06 mm) (JIS-X6245) for DVD (DVD-R) media.

Therefore, if the reference value is stored as H using the tolerance (+/−) for CD media, which has a relatively large tolerance range for these media types, it can be determined that there is one media (disc) left when the measured value is within the range from (H+0.3 mm) to (H−0.1 mm).

It will also be obvious that an additional margin may be added to these tolerances and whether or not a disc is the last one can be decided by determining if the measured media height is within the defined range.

If the medium is determined to be the last one, the media stacker 21 will become empty as a result of the picking operation picking the last one disc, and the notification unit 303 therefore sends a no-media (near-end) report to the host computer 400 (step S205). The host computer 400 receives this report and indicates on a display unit, for example, that no media are present (step S206). As a result, the user can be prompted to add media to the media stacker before the last disc is processed.

In the media processing device and control method therefore according to the first embodiment of the invention, the transportation arm 36 is lowered into the media stacker 21 before shipping from the factory after placing one reference medium that is precisely controlled to the rated thickness in the media stacker. When the media detection mechanism 200 disposed to the transportation arm 36 detects the medium, the transportation arm 36 is stopped and the transportation arm 36 is then raised again while looking for the position at which the media detection mechanism 200 does not detect the medium, and this position is stored in the storage unit 310 as a reference value. As a result, even if there is variation in the precision of the molded parts of the assembly or dimensional differences caused by variations in the assembly, an accurate reference value can be acquired for each individual product. The last media can therefore be highly accurately detected by using an accurate reference value. It is therefore not necessary to repeat the media picking operation for confirmation after picking the last medium, and wasteful operations can be eliminated.

A media processing device and control method therefor according to a second embodiment of the invention are described next.

Figure 11:
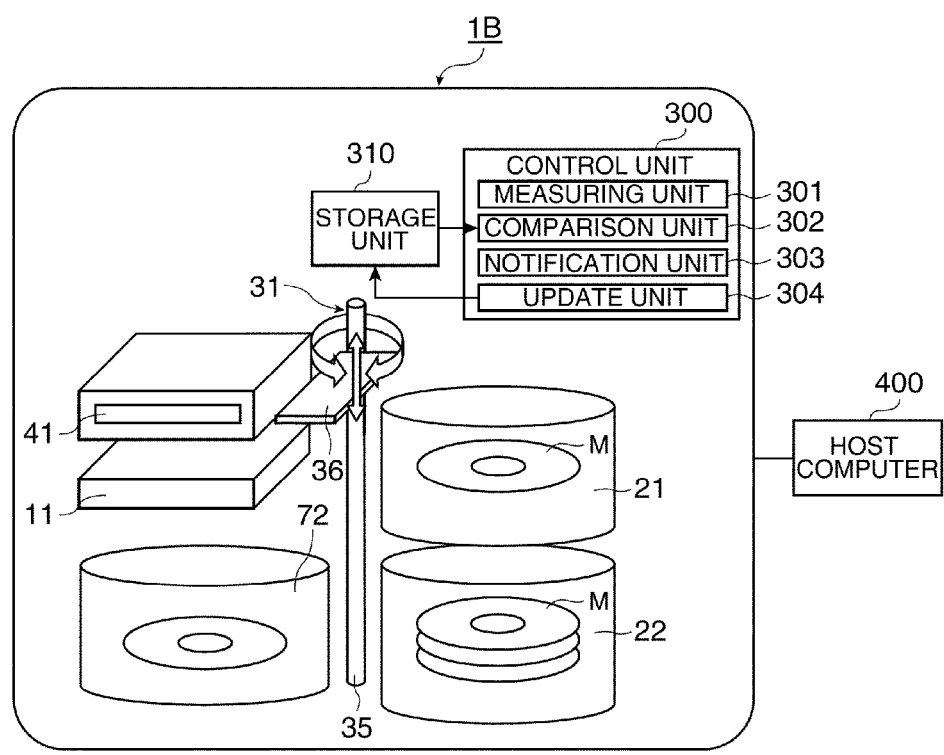
FIG. 11 is a block diagram showing the configuration of the main parts of the control system of the media processing device according to a second embodiment of the invention.

FIG. 11 is a block diagram showing the main components of the control system of the media processing device according to the second embodiment of the invention. As shown in the figure, this media processing device 1B has a control unit 300 for controlling other parts, and a storage unit 310. The control unit 300 controls the media drives 41 and label printer 11 disposed as media processing units in the media processing device 1B, and the media transportation mechanism 31 for conveying media to these media processing units (the media drives 41 and label printer 11). The control unit 300 is also connected to a host computer 400.

As shown in FIG. 11, the control unit 300 has a measuring unit 301 that controls the media transportation mechanism 31 including the vertically movable transportation arm 36, and measures the height of the media in the media stackers 21 and 22 each time the media picking process executes. The control unit 300 also has a comparison unit 302, a notification unit 303, and an update unit 304. The comparison unit 302 compares the measured media height with a reference value, and if the difference is within a predetermined range determines that number of media remaining in the media stacker 21 or 22 is one or another predetermined count. The notification unit 303 reports to the host computer 400 when the remaining media count in the media stacker 21, 22 at the current time is one or the specified count. When a disc is picked by the media transportation mechanism 31, the update unit 304 updates the reference value by using the media height when the remaining media count is determined to be one as the new reference value.

This embodiment of the invention thus adds this update unit 304 to the configuration of the media processing device according to the first embodiment of the invention.

When the media processing device is used and media are processed, the control method of the media processing device according to the second embodiment of the invention controls the media transportation mechanism 31 including the vertically movable transportation arm 36 to measure the height of the media stacked in one of the media stackers 21 and 22 (note that media stacker 21 is used by way of example below) and detect the one last medium in the stacker. The reference value is then updated by using the media height at which the last medium was detected as the new reference value that is stored in the storage unit 310.

Figure 12:
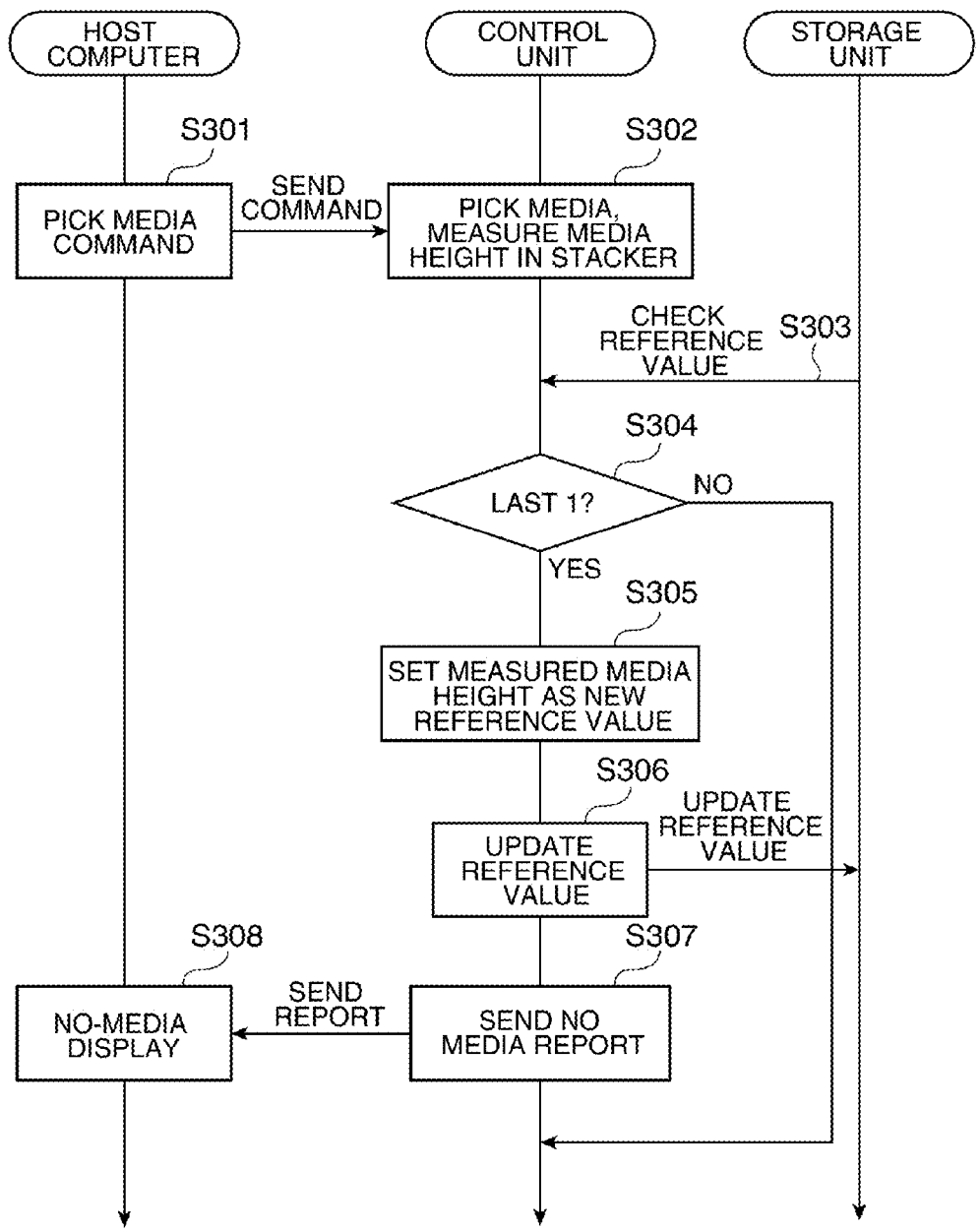
FIG. 12 is a flow chart describing the control method of a media processing device according to an embodiment of the invention.

FIG. 12 is a flow chart showing the steps in the control method of a media processing device according to an embodiment of the invention.

As shown in the control method of the media processing device according to the first embodiment of the invention and described in steps S101 to S104 in FIG. 9. The media transportation mechanism 31 has a vertically movable transportation arm 36 controlled by the control unit 300 to measure the media height in the media stackers 21 and 22 (note that media stacker 21 is used by way of example below) containing only one reference medium that is manufactured to the precise thickness defined by the media standard. The measured media height is then set as the factory reference value and stored in the storage unit 310, which is rendered by a nonvolatile memory device (such as EEPROM).

When the media processing device 1B is used, the control process described below and shown in FIG. 12 is executed.

As shown in FIG. 12, when a media pick command is sent from the host computer 400 based on a media processing command, for example, when the media processing device is used (step S301), the control unit 300 measures the height of the media stack in the media stacker 21 containing media and executes the media picking process (step S302).

The control unit 300 then reads the reference value that was stored at the factory (step S303) and determines if the measured value is within the tolerance range of the rated media thickness with regard to the reference value, and determines if the detected media is the last one media left in the media stacker (step S304).

As described in the first embodiment above, if the reference value is stored as H using the tolerance (+/−) for CD media, which has a relatively large tolerance range for these media types, it can be determined that there is one media (disc) left when the measured value is within the range from (H+0.3 mm) to (H−0.1 mm).

It should be noted that an additional margin may be added to these tolerances and whether or not a disc is the last one can be decided by determining if the measured media height is within the defined range.

If the comparison done in step S304 determines that the detected medium is the last one medium, the update unit 304 sets the last measured media height as the new reference value (step S305) and updates the reference value using (step S306). The reference value is thus updated every time the last one medium is confirmed.

It should be noted that the reference value may alternatively be updated only when the difference between the measured value and the previous reference value is greater than or equal to a predetermined difference. For example, if a difference of 60% or more of the tolerance range for CD media is used as this predetermined difference, the reference value may be updated only when the measured value is greater than or equal to (H+0.18 mm) or is less than or equal to (H−0.06 mm). This enables not updating the reference value when there is substantially no difference between the measured value and the reference value.

Because the media stacker 21 will become empty as a result of the picking operation picking the last one disc, the notification unit 303 sends a no-media report to the host computer 400 (step S307). The host computer 400 receives this report and indicates on a display unit, for example, that no media are present (step S308). As a result, the user can be prompted to add media to the media stacker before the last disc is processed.

Each time the one remaining medium is detected from the measured value of the stacked media height, the control method of the media processing device according to the second embodiment of the invention sets the measured value as the new reference value. As a result, because a recently measured value is set as the reference value when the bottom position (height) of the media stacker changes due to aging of the media processing device 1B, the media height can be accurately measured.

Furthermore, even if the user uses media conforming to different standards, such as the media thickness, this embodiment of the invention can accurately measure the media height because the reference value is updated accordingly based on the medium that is actually used.

Because the last medium can always be accurately detected, it is not necessary to repeat the media picking operation for confirmation after picking the last medium, and wasteful operations can be eliminated.

It should be noted that the media drives 41, label printer 11, and media transportation mechanism 31 are all managed by a single control unit 300 in the first embodiment and second embodiment (FIG. 8 and FIG. 11) described above, but separate control units and interfaces may be provided for each.

It will be obvious to one with ordinary skill in the related art that the invention is not limited to use with disk-shaped media such as the media described in the foregoing first embodiment and second embodiment, and the invention may also be applied to media of other shapes, including rectangular or other polygonal media and oval media. The recording method is also not limited, and optical recording, magneto-optical recording, and other recording methods may be used.

Furthermore, the embodiments are described using a single medium by way of example, but the same operation can be used with any predetermined number of media. In this situation the values described above will be multiples determined from the number of media in the stack. A no-media report can be output when the remaining media count goes to the predetermined number instead of to 1.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media processing device, comprising:
a media stacker that stores media in a stack;
a media processing unit that writes data and/or prints a label on the media;
a media transportation mechanism having a transportation arm that can hold and move the media, and transport the media between the media stacker and the media processing unit;
a storage unit that stores a reference value for a media height that corresponds to a specified number of media in the media stacker; and
a control unit that controls the media processing units and the media transportation mechanism, the control unit including:
a measurement unit that measures the height of media stacked in the media stacker when media is removed from the stacker by the media transportation mechanism to obtain a measurement, and
a comparison unit that compares the measurement with the reference value to detect a difference therebetween, and determines a remaining media count in the media stacker when the difference is within a specified range,
wherein the control unit includes an update unit that updates the reference value by using the measurement as a new reference value, from which the comparison unit determines the media is of a specified number when a medium is removed by the media transportation mechanism.

2. The media processing device described in claim 1, wherein the storage unit stores a media thickness, and the comparison unit determines the remaining media count in the media stacker based on the specified range defined according to the media thickness.

3. The media processing device described in claim 1, wherein the update unit updates the reference value only when the measured value differs from the previous reference value by a specific value or more.

4. The media processing device described in claim 1, wherein the control unit includes a notification unit that reports to a host computer that the media stacker is in a no-media state when the comparison unit determines the media is a specified number when a medium is removed by the media transportation mechanism.

5. The media processing device described in claim 1, wherein the update unit updates the reference value based on a determination that a difference between the measured media height and the reference value is greater than or equal to a predetermined difference.

6. The media processing device described in claim 1, wherein the media stacker is a top media stacker positioned above a bottom media stacker that stores the media in a stack after being processed by the media processing unit.

7. The media processing device described in claim 6, further comprising a batch media stacker that receives batches of the media from the bottom media stacker.

8. The media processing device described in claim 7, further comprising a drawer media stacker that receives media from the bottom media stacker or top media stacker when the batch media stacker is removed.

9. A control method for a media processing device that stores media in a media stacker, comprising:
   receiving a request to process media;
   transporting the media using a media transportation mechanism having a transportation arm between the media stacker and a media processing unit by moving the transportation arm;
   measuring the media height in the media stacker; and
   comparing the media height with a reference value to detect the difference therebetween;
   determining the remaining media count in the media stacker; and
   updating the reference value using the measured media height and determining if the media is of a specified count.

10. The control method for a media processing device described in claim 9, wherein the reference value is a predetermined value equivalent to the media height having a value of 1.

11. The control method for a media processing device described in claim 9, wherein measuring the media height comprises lowering the transportation arm into the media stacker, and then raising the transportation arm to a height until a media detector on the transportation arm no longer detects media, wherein the height is the measured media height.

12. The control method for a media processing device described in claim 9 additionally comprising:
   sending a no-media report to a host computer after determining the media is of a specified count.

13. The control method for a media processing device described in claim 9, wherein the media is determined to have a count of 1.

14. The control method for a media processing device described in claim 9, wherein the media processing unit writes date and/or prints a label on the media.

15. The media processing device described in claim 9, wherein updating the reference value is based on a determination that a difference between the measured media height and the reference value is greater than or equal to a predetermined difference.

16. The control method for a media processing device described in claim 9, wherein determining the remaining media count comprises determining if the measured media height is within a tolerance range of the reference value.

17. The control method for a media processing device described in claim 16, additionally comprising:
   sending a no-media report to a host computer after determining the measured media height is within the tolerance range of the reference value.

18. A control unit of a media processing device, the control unit including a control program, which when executed by the control unit performs a method comprising:
   receiving a request to process media;
   transporting the media using a media transportation mechanism having a transportation arm between the media stacker and a media processing unit by moving the transportation arm;
   measuring the media height in the media stacker; and
   comparing the media height with a reference value to detect the difference therebetween;
   determining the remaining media count in the media stacker; and
   updating the reference value using the measured media height and determining if the media is of a specified count.

19. The control unit described in claim 18, wherein determining the remaining media count comprises determining if the measured media height is within a tolerance range of the reference value.

* * * * *